US006848300B2

(12) United States Patent
Schmid et al.

(10) Patent No.: US 6,848,300 B2
(45) Date of Patent: Feb. 1, 2005

(54) METHOD AND APPLIANCE FOR DIAGNOSIS OF AN EXHAUST TURBOCHARGER FOR AN INTERNAL COMBUSTION ENGINE

(75) Inventors: Wolfram Schmid, Nuertingen (DE); Harald Wedler, Neuhausen (DE)

(73) Assignee: DaimlerChrysler AG, Stuttgart (DE)

( * ) Notice: Subject to any disclaimer, the term of this patent is extended or adjusted under 35 U.S.C. 154(b) by 189 days.

(21) Appl. No.: 10/217,207

(22) Filed: Aug. 12, 2002

(65) Prior Publication Data

US 2003/0033889 A1 Feb. 20, 2003

(30) Foreign Application Priority Data

Aug. 16, 2001 (DE) ........................................ 101 40 121

(51) Int. Cl.[7] ............................................ G01M 19/00

(52) U.S. Cl. .................................................... 73/118.1

(58) Field of Search ............................ 73/118.1, 119 R, 73/115, 118.2; 701/100, 99; 702/140; 340/439; 60/602, 603; 364/431.12

(56) References Cited

U.S. PATENT DOCUMENTS 4,046,003 A * 9/1977 Armstrong et al. ........ 73/118.1
5,307,632 A * 5/1994 Gottemoller et al. ......... 60/608
6,163,254 A * 12/2000 Smith et al. ................ 340/439
6,209,390 B1 * 4/2001 LaRue et al. ............ 73/119 R
6,250,145 B1 * 6/2001 Honold et al. ........... 73/119 R
6,256,992 B1 * 7/2001 Lewis et al. .................. 60/603

FOREIGN PATENT DOCUMENTS

EP 0 491 275 10/1994

* cited by examiner

*Primary Examiner*—Edward Lefkowitz
*Assistant Examiner*—Octavia Davis
(74) *Attorney, Agent, or Firm*—Kenyon & Kenyon

(57) ABSTRACT

In a method for diagnosis of an exhaust turbocharger for an internal combustion engine, at least one value which characterizes the load on the exhaust turbocharger is determined and compared with a reference value, an event signal being generated in the event of the reference value being exceeded. A wear characteristic number which characterizes the alternating load on the exhaust turbocharger is formed by addition of load signals, in each case one change signal being generated whenever the charger speed of the exhaust turbocharger exceeds a maximum.

17 Claims, 2 Drawing Sheets

METHOD AND APPLIANCE FOR DIAGNOSIS OF AN EXHAUST TURBOCHARGER FOR AN INTERNAL COMBUSTION ENGINE

CROSS-REFERENCE TO RELATED APPLICATIONS

The present application claims priority to Application No. 101 40 121.3, filed in the Federal Republic of Germany on Aug. 16, 2001, which is expressly incorporated herein in its entirety by reference thereto.

FIELD OF THE INVENTION

The present invention relates to a method and an appliance for diagnosis of an exhaust turbocharger for an internal combustion engine.

BACKGROUND INFORMATION

Turbochargers in internal combustion engines are subject to high centrifugal forces due to high rotational speeds. These forces lead to correspondingly high loads on the material of the turbine wheel and of the compressor wheel of the exhaust turbocharger. These loads can lead to damage to the rotating components and therefore to failure of the exhaust turbocharger. To determine that the load limit has nearly been reached and to avoid damage, it is provided, in accordance with European Published Patent Application No. 0 491 275, for the ratio of boost pressure to induction pressure in the induction tract of the internal combustion engine to be monitored and compared with a predetermined minimum ratio, an alarm signal being generated if the actual ratio is lower than the minimum ratio. The minimum ratio characterizes a minimum boost pressure which is to be achieved under the current conditions of the internal combustion engine as a function of the induction pressure. If this minimum pressure is not achieved, there are critical operating conditions, whereupon the warning signal is generated, in order to alert the driver to the malfunction.

The appliance and method described in European Published Patent Application No. 0 491 275 have the drawback that a warning signal is only generated when the boost pressure which is to be generated is no longer achieved and therefore correct operation cannot be ensured. Furthermore, there is a risk that by this time material has already been damaged as a result of an excessively high load, and during further operation this damage can lead to complete failure of the charger.

It is an object of the present invention to avoid damage in exhaust turbochargers as a result of high material loads and indicating unacceptably high loads at an early stage.

SUMMARY

The above and other beneficial objects of the present invention are achieved by providing a method and appliance as described herein.

The method according to the present invention makes it possible to avoid damage to, e.g., the compressor wheel which is attributable to alternating loads caused, e.g., by frequent changes to the rotational speeds of the charger. Alternating loads of this type, which are characterized by a change in the rotational speed between a local maximum and a local minimum, may lead to a rotating component of the exhaust turbocharger breaking in the event of a high number of individual loads (low cycle fatigue), and, e.g., the compressor wheel breaking, this wheel usually having a larger diameter and therefore being exposed to greater centrifugal forces than the turbine wheel.

The alternating load is characterized with reference to a wear characteristic number which may be formed by addition of individual, e.g., discrete load signals which are in each case generated in the event of the charger speed of the exhaust turbocharger exceeding a maximum. The maxima may be local maxima, and the charger speed drops again after these maxima have been exceeded. In an example embodiment, a subsequent local minimum for the charger speed is awaited before a load signal is generated. Passage through a local maximum and a subsequent local minimum—or the reverse order—characterizes a single, complete passage through an alternating load cycle.

The wear characteristic number, which may be formed by addition of the individual load signals, may be continuously compared with a reference value, and, in the event of the reference value being exceeded, an event signal is generated on the basis of which further measures are initiated, for example a warning is transmitted to the driver and/or the engine torque is limited.

The diagnosis system involves predictive charger diagnosis, since even before loads which damage components occur, countermeasures are taken or the driver is made aware of changes in the material in the compressor wheel, e.g., that the exhaust turbocharger has reached a load state in which further measures, such as for example replacement of the loaded components, are required.

The alternating load signals may be calculated by forming the reciprocal of a maximum permissible alternating load number, which in turn is determined as a function of the current charger speed maximum passed through and, e.g., also of the current charger speed minimum passed through. The maximum permissible alternating load number represents the number of alternating loads between the observed charger speed minimum and the charger speed maximum at which breakage of the material is to be expected. A load signal represents the precise number of alternating loads at which, in the event of repeated loading up to the permissible alternating load number, breakage will occur.

Since various ranges of values for the charger speed maximum and the charger speed minimum are each assigned an alternating load number and the load signals are continuously added to form the wear characteristic number, the wear characteristic number is composed of alternating loads of different orders of magnitude. In this context, account is taken of the fact that different levels of alternating loads may lead to a break even if alternating loads from a single order of magnitude have not yet reached the maximum permissible alternating load number for this order of magnitude.

Due to the formation of the reciprocal of the alternating load number, the reference value may be one. However, it may also be set to a value of less than one, e.g., in order to take account of the driving characteristics of the particular driver, in order, for example, to take account of a driving style involving frequent acceleration and braking and to warn the driver so early or restrict the component loads so early that sufficient time remains to take countermeasures, for example to carry out maintenance on the components or to warn the driver in sufficient time. Therefore, in the case of a driving style with frequent acceleration and braking operations, the reference value assigned to the respective wear characteristic numbers may be set to be lower than with a more constant driving style involving fewer acceleration and braking operations.

The alternating load numbers, which are dependent on the material and geometry of the component under investigation, are determined, for example, empirically in advance and are stored in the diagnosis device. To limit the outlay on determining the alternating load numbers, the alternating load numbers may be categorized, each alternating load category including a plurality of individual alternating load numbers. The categorization provides that it is sufficient to determine a smaller number of alternating load numbers and store these numbers in the diagnosis device.

Each charger speed maximum may also be assigned a charger speed minimum of a predetermined level, in which case there may be a minimum speed difference between the maximum and minimum, which difference, however, may be determined as a function of the maximum. In an example embodiment of the present invention, the charger speed minimum may be expressed as a constant value of the maximum, for example 20% to 70% of the maximum, in which case it is also possible to use intermediate values between 20% and 70% of the maximum. Alternatively, however, non-linear dependencies of the charger speed minimum as a function of the maximum or other state and operating variables of the internal combustion engine and/or the charger or other units may be suitable.

If the wear characteristic number exceeds the respectively associated reference value, the remedial measure or event may involve reducing the exhaust gas backpressure, for example by opening a waste gate or a variable turbine geometry, with the result that the energy potential available for driving the charger is reduced and the charger speed and component loads are reduced accordingly by centrifugal forces. Another possible option, which may be performed in addition or as an alternative, provides for the maximum engine torque to be limited by restriction of the quantity of fuel injected in the event of a reference value for the wear characteristic number being exceeded, in order to extend the service life of the charger. In this manner, both the maximum engine torque and the increase in the charger rotational speed may be limited.

DETAILED DESCRIPTION

Figure 1:
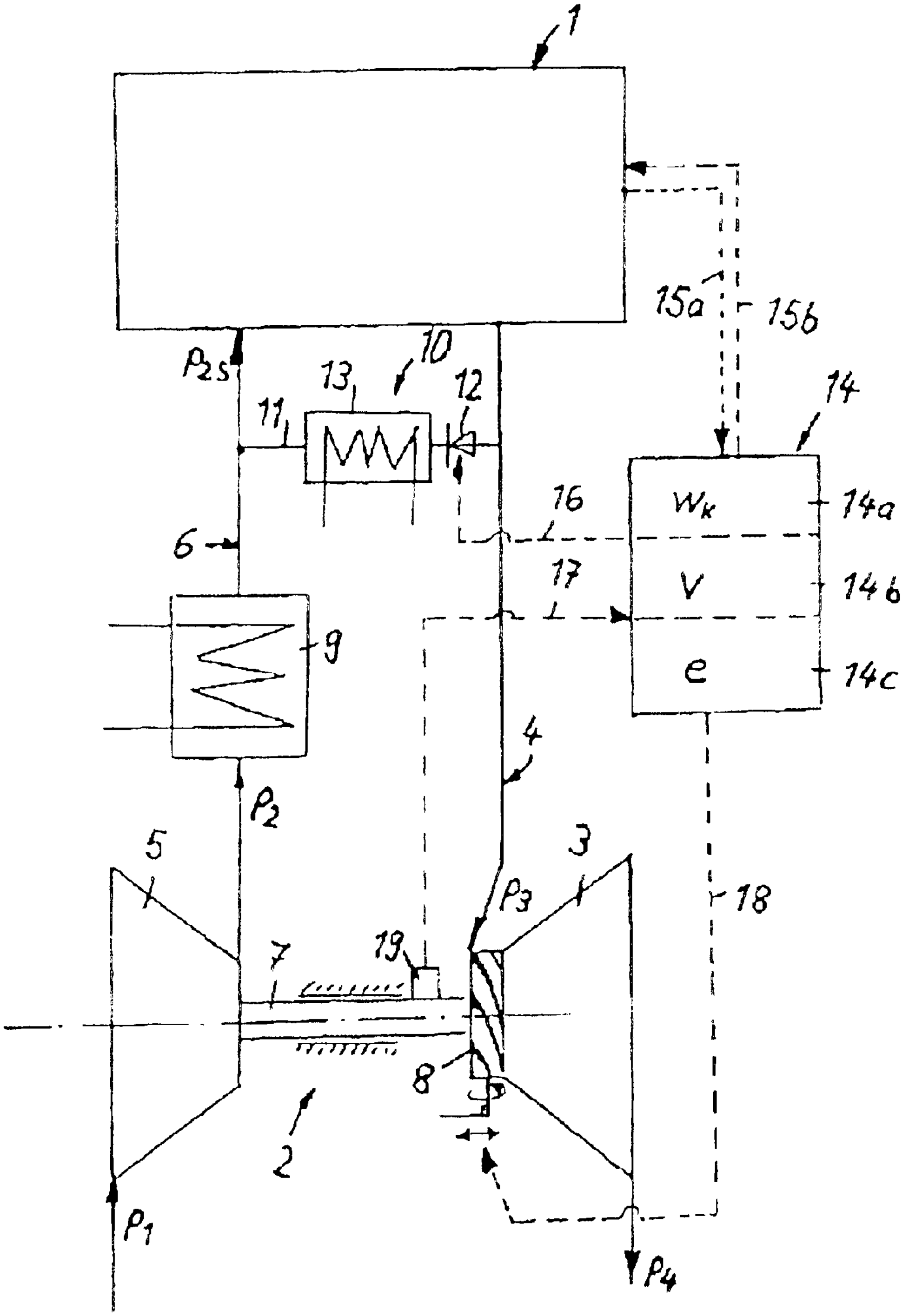
FIG. 1 is a schematic view of an internal combustion engine with exhaust turbocharger and a diagnosis system for recognizing alternating loads on the charger in the exhaust turbocharger.

The internal combustion engine 1 illustrated in FIG. 1—a diesel engine or a spark ignition engine—is assigned, as an additional unit, an exhaust turbocharger 2 with an exhaust turbine 3 in the exhaust section 4 and a compressor 5 in the induction tract 6, the compressor 5 being driven via a shaft 7 of the exhaust turbine 3. The compressor 5 sucks in ambient air at atmospheric pressure $p_1$ and compresses it to the elevated pressure $p_2$. In the induction tract 6 downstream of the compressor 5 there is a charge air cooler 9, in which the compressed air is cooled. After it has passed through the charge air cooler 9, the charge air is fed under the charge pressure $p_{2s}$ to the cylinder intakes of the internal combustion engine 1.

On the exhaust side, the exhaust turbine 3 is driven by the exhaust gases in the exhaust section 4, which are under the exhaust gas backpressure $p_3$. After they have flowed through the exhaust turbine, the exhaust gases adopt the expanded pressure $p_4$ and, as they pass onwardly, are subjected to catalytic cleaning and are ultimately discharged from the exhaust section.

The exhaust turbine 3 is equipped with a variable turbine geometry 8 which, while the internal combustion engine is operating, allows variable adjustment of the effective flow inlet cross-section to the turbine wheel of the exhaust turbine. The variable setting of the flow inlet cross-section may be used both in fired driving mode and to generate braking power in engine braking mode. The variable turbine geometry 8 is in this example embodiment adjustable between an open position, with a maximum flow inlet cross-section, and a blocking position, with a minimal flow inlet cross-section. The variable turbine geometry may be formed as an adjustable guide vane array which may be pushed axially into the free flow inlet cross-section, or may have adjustable guide vanes.

Furthermore, an exhaust gas recirculation device 10 is provided between the exhaust section 4 and the induction tract 6, which device, in a recirculation line 11, includes an adjustable recirculation valve 12 and a cooler 13. The recirculation line 11 connects the exhaust section 4 and the induction tract 6 upstream of the exhaust turbine 3 or downstream of the charge air cooler 9. Particularly in the part load range, the recirculation valve 12 may be set to the open position so as to recirculate a partial mass flow of the exhaust gas.

The internal combustion engine 1 and the various units which are assigned to the internal combustion engine are set using a control unit 14. The control unit 14 is connected to the internal combustion engine 1, the recirculation valve 12, a sensor 12 which senses the charger speed $n_{TL}$ and the variable turbine geometry 8, e.g., via signal lines 15*a*, 15*b*, 16, 17 and 18. Information from the internal combustion engine 1, for example the engine speed, is transmitted to the control unit 14 via the signal line 15*a*. Control signals from the control unit 14 are transmitted to the internal combustion engine 1 via the signal line 15*b*, e.g., control signals for setting the quantity of fuel which is to be injected. The recirculation valve 12 is set via the signal line 16. The information concerning the charger speed $n_{TL}$ recorded in the speed sensor 19 is transmitted to the control unit 14 via the signal line 17. The variable turbine geometry in the exhaust turbine 3 is set via the signal line 18.

If appropriate, the charger speed may also be determined using a mathematical model or from characteristic diagrams from known state and operating variables of the internal combustion engine and/or the associated units. In this example embodiment, a rotational speed sensor for measuring the charger speed may be dispensed with.

The control unit 14 includes various sub units or devices 14*a*, 14*b*, 14*c*, in which, a load signal $w_k$, which characterizes the alternating load on the charger and for example the compressor wheel, is generated for example from the information about the charger speed. A wear characteristic number v, which ultimately may produce an event signal e which leads to a further measure, for example a warning indication or an intervention in the engine management, is generated from the load signal $w_k$. This allows diagnosis of an exhaust turbocharger, which is described in more detail below with reference to the flow diagram illustrated in FIG. 2.

Figure 2:
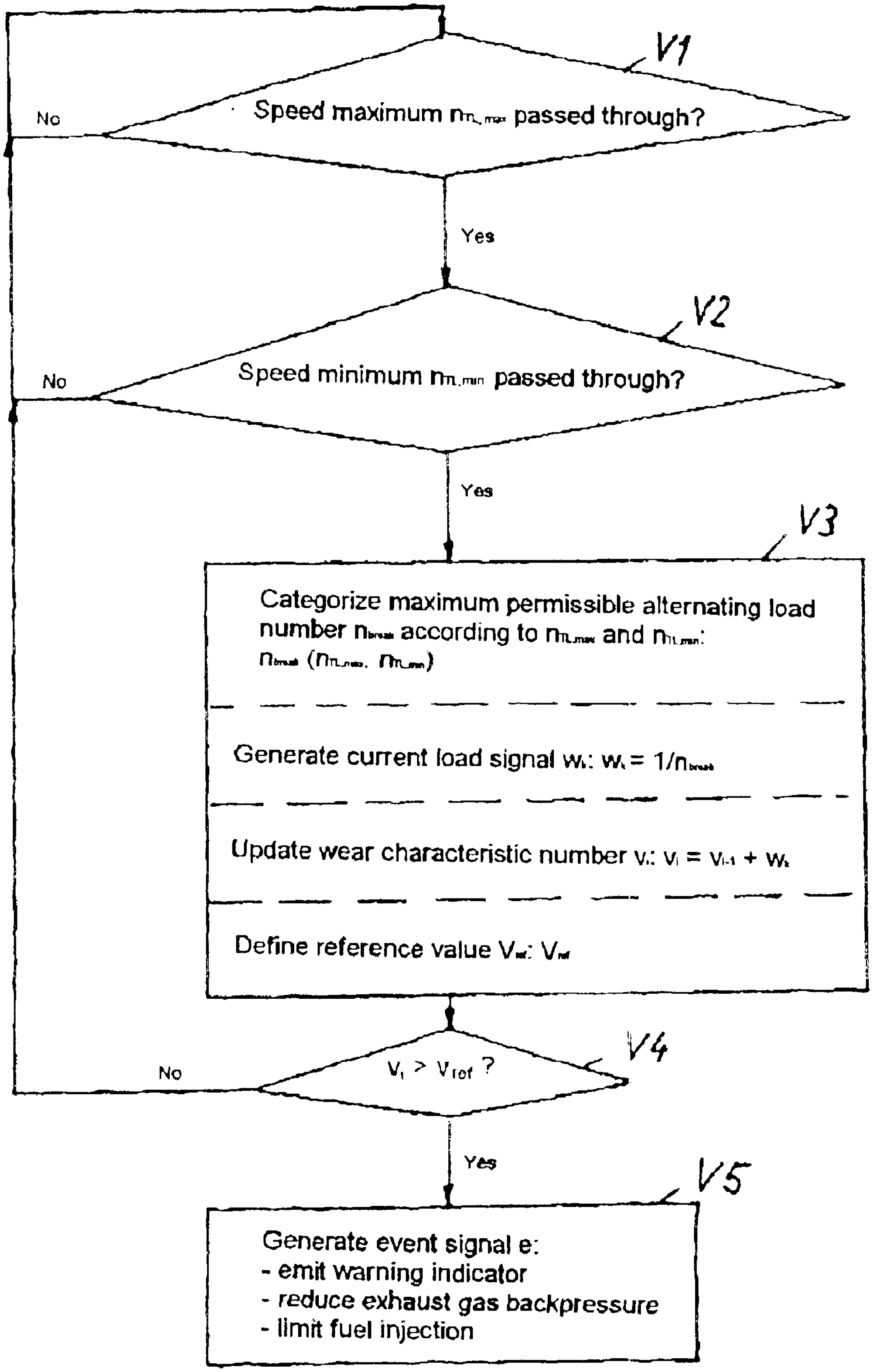
FIG. 2 is a flow diagram illustrating the method steps involved in performing carrying out the diagnosis of the exhaust turbocharger.

As illustrated in FIG. 2, in a first method step V1, it is checked whether the charger speed $n_{TL}$ has reached or exceeded a speed maximum $n_{TL,\,max}$, which is characterized in that the charger speed drops back to a lower level after reaching a local maximum value. If the condition described by method step V1 is not satisfied, the charger speed $n_{TL}$ is still rising or is being held at a constant level. In this case, the procedure returns to the start of interrogation V1 via the no branch, and this operation is repeated at cyclical intervals.

Otherwise, a speed maximum $n_{TL,max}$ has already been passed through and the method continues along the yes branch to the following method step V2, in which it is checked whether the charger speed $n_{TL}$ has passed through a speed minimum $n_{TL,min}$. This is the case when a minimum value of the charger speed has been reached and, following this, the charger speed rises again. If the condition described in method step V2 is not satisfied, the condition described in method step V2 is interrogated again at cyclical intervals via the no branch. If the condition is satisfied, the yes branch is followed to the next method step V3.

If both the condition for the speed maximum $n_{TL,max}$ and for the speed minimum $n_{TL,min}$ are satisfied, there is a single, completed load cycle of an alternating load acting on the charger and in particular the compressor wheel, resulting from the change in the centrifugal forces acting on the compressor wheel as a result of the fluctuation in the charger speed between speed maximum $n_{TL,max}$ and speed minimum $n_{TL,min}$. Depending on the speed level and the speed difference between $n_{TL,max}$ and $n_{TL,min}$, only a limited number of alternating loads of this type may be performed without the risk of damage to the material. The number of alternating loads which characterize the load limit—the maximum permissible alternating load number $n_{break}$—is stored in stress cycle diagrams as a function of material and geometry.

To ensure that minor fluctuations in rotational speed, which do not yet represent an alternating load, are not regarded as an alternating load cycle, which would lead to a premature warning indication and/or to premature intervention in the engine management, it is possible for the speed minimum $n_{TL,min}$ to be determined as a function of the speed maximum $n_{TL,max}$ which is reached. It is possible to ensure that there is a minimum speed difference between the speed minimum $n_{TL,min}$ and the speed maximum $n_{TL,max}$. The charger speed minimum may be determined for example as a constant value of the charger speed maximum and may be set, for example, to 30% of the maximum.

If the conditions from the first two method steps V1 and V2 are present, in method step V3 a categorized alternating load number $n_{break}$ ($n_{TL,max}$, $n_{TL,min}$) is determined as a function of the level of the current charger speed maximum $n_{TL,max}$ and the current charger speed minimum $n_{TL,min}$. The categorization allows the total number of alternating load cycles stored in the diagnosis device to be limited. Each alternating load category to which the theoretical, precise alternating load number is allocated includes a plurality of individual alternating load numbers. To determine the categorized alternating load number $n_{break}$ which is currently to be used, it is possible for a load on the charger which corresponds to the current charger speed maximum $n_{TL,max}$ and the current charger speed minimum $n_{TL,min}$ to be determined as an intermediate result and for the desired alternating load category to be determined from the load.

After the categorized alternating load number $n_{break}$ has been determined, in method step V3 a current load signal $w_k$ is determined by forming the reciprocal of the alternating load number in accordance with the following formula:

$$w_k = 1/n_{break}.$$

An individual load signal corresponds to an individual alternating load between charger speed maximum and charger speed minimum. In the event of repeated loading up to the associated alternating load number $n_{break}$, a break is to be expected.

As the method continues, the wear characteristic number $v_i$ is calculated or updated by adding the current load signal to the previous signals in accordance with the following relationship:

$$v_i = v_{i-1} + w_k.$$

In this relationship, the index "i" characterizes values for the current method operation, and the index "i-1" characterizes values from the preceding method operation.

Finally, a reference value $V_{ref}$ which is assigned to the current wear characteristic number $v_i$ is determined, and the comparison characteristic number $v_1$ is compared with this reference value in order to determine the current loading state of the charger or the compressor wheel. The maximum value of the reference number is one. When the reference value $V_{ref}$ is being determined, the previous handling may also be taken into account, for example by using the number of alternating load cases within a defined time to determine the reference value. If a large number of alternating load situations has occurred within a defined time, it may be assumed that this alternating load rate will also be maintained in the future. To ensure that, despite a high alternating load rate, the driver has sufficient time to have the exhaust turbocharger inspected after a warning indicator has been provided, in the case of a relatively high alternating load rate, the reference value is reduced to a value of lower than one.

In the next method step V4, the current wear characteristic number $v_i$ is compared with the associated reference value $V_{ref}$. If the wear characteristic number $v_i$ exceeds the associated reference value $V_{ref}$, the number of alternating loads is such that, for safety reasons, it initiates further actions, which are described in method step V5, which is reached via the yes branch. If the wear characteristic number $v_1$ is still below the associated reference value $V_{ref}$, the method returns to the start of the diagnosis method, to method step V1, along the no branch.

In method step V5, an event signal e is generated, which leads to a warning indicator being shown to the driver and/or to intervention in the engine management or in one of the units of the internal combustion engine. By way of example, the fuel injection may be limited in order to limit the engine torque which is generated, so that also only a reduced quantity of exhaust gas is generated and available for driving the exhaust turbocharger. In the region of the units of the internal combustion engine, the exhaust gas backpressure in the exhaust section may be reduced, for example by opening the variable turbine geometry or a bypass or waste gate which bypasses the exhaust turbine. The exhaust gas backpressure may also be reduced by opening the exhaust gas recirculation device.

As an alternative to direct measurement of the charger speed via a speed sensor, the charger speed may also be calculated indirectly via the engine speed, the engine torque, the charger air pressure and atmospheric pressure. The model used to determine the charger speed may be based on engine characteristic diagrams, thermodynamic calculations or on neural networks.

What is claimed is:

1. A method for diagnosis of an exhaust turbocharger for an internal combustion engine, comprising the steps of:

determining at least one value which characterizes a load on the exhaust turbocharger;

comparing the at least one value with a reference value;

generating an event signal if the at least one value exceeds the reference value;

generating a load signal in accordance with a charger speed of the exhaust turbocharger exceeding a charger speed maximum; and forming a wear characteristic number that characterizes an alternating load on the exhaust turbocharger by addition of load signals.

2. The method according to claim 1, wherein the load signal is generated in the load signal generating step only if the charger speed falls below a charger speed minimum after the charger speed maximum.

3. The method according to claim 2, wherein the load signal is generated in the load signal generating step only if the charger speed maximum and the charger speed minimum have a minimum speed difference.

4. The method according to claim 3, further comprising the step of determining the minimum speed difference as a function of the charger speed maximum.

5. The method according to claim 1, wherein the load signal generating step includes the substep of determining the load signal by forming a reciprocal of a maximum permissible alternating load number determined as a function of the current charger speed maximum according to the formula:

$$w_k = 1/n_{break},$$

wherein $w_k$ represents the load number and $n_{break}$ represents the maximum permissible alternating load number.

6. The method according to claim 5, wherein the maximum permissible alternating load number is allocated to one of a plurality of discrete categories, each category including a plurality of individual alternating load numbers.

7. The method according to claim 5, further comprising the step of determining the maximum permissible alternating load number as a function of the current charger speed minimum.

8. The method according to claim 1, further comprising the step of providing a warning indicator to a driver if the wear characteristic number exceeds the reference value.

9. The method according to claim 1, further comprising the step of reducing exhaust backpressure by opening one of a waste gate and a variable turbine geometry if the wear characteristic number exceeds the reference value.

10. The method according to claim 1, further comprising the step of limiting maximum engine torque by restricting a quantity of fuel injected if the wear characteristic number exceeds the reference value.

11. The method according to claim 1, further comprising the step of limiting a change in the charger rotational speed by restricting a quantity of fuel injected if the wear characteristic number exceeds the reference value.

12. The method according to claim 1, further comprising the step of determining the reference value, including the substeps of taking into account a handling performance and reducing the reference value if an alternating load rate characterized by alternating loads per running time exceeds a limit value.

13. An appliance for diagnosis of an exhaust turbocharger for an internal combustion engine, comprising:

a device configured to determine a charger speed of the exhaust turbocharger;

a device configured to generate a load signal if the charger speed of the exhaust turbocharger exceeds a speed maximum;

a device configured to form a wear characteristic number by addition of load signals; and a device configured to compare the wear characteristic number with a reference value and to generate an event signal if the reference value is exceeded.

14. The appliance according to claim 13, wherein the appliance is configured to perform a method including the steps of:

determining at least one value which characterizes a load on the exhaust turbocharger;

comparing the at least one value with the reference value;

generating the event signal if the at least one value exceeds the reference value;

generating the load signal in accordance with the charger speed of the exhaust turbocharger exceeding the charger speed maximum; and forming the wear characteristic number that characterizes an alternating load on the exhaust turbocharger by addition of load signals.

15. The method according to claim 1, further comprising predicting damage to a component of the exhaust turbocharger.

16. The method according to claim 15, wherein the component includes a rotating component.

17. The method according to claim 15, wherein the component includes a compressor wheel.

* * * * *